United States Patent [19]

Solomon

[11] 4,048,426
[45] Sept. 13, 1977

[54] CROSSLINKING IN EMULSION POLYMERIZATION

[75] Inventor: Paul W. Solomon, Bartlesville, Okla.

[73] Assignee: Phillips Petroleum Company, Bartlesville, Okla.

[21] Appl. No.: 652,443

[22] Filed: Jan. 26, 1976

Related U.S. Application Data

[62] Division of Ser. No. 576,945, May 12, 1975, Pat. No. 3,956,400.

[51] Int. Cl.$^2$ .................. C08F 212/08; C08F 216/12; C08F 236/02

[52] U.S. Cl. ................................ 526/334; 260/614 R; 526/293; 526/295

[58] Field of Search ....................... 526/334, 340, 346

[56] References Cited

U.S. PATENT DOCUMENTS

| 2,412,921 | 12/1946 | Sparks ................................... 526/334 |
| 2,561,154 | 7/1951 | Tawney ................................. 526/334 |

Primary Examiner—Harry Wong, Jr.

[57] ABSTRACT

Diisoprenyl ether added to an alkadiene/monovinyl arene emulsion polymerization mixture increases the Mooney viscosity of a polymer.

6 Claims, No Drawings

CROSSLINKING IN EMULSION POLYMERIZATION

This is a divisional application of my copending patent application, Ser. No. 576,945 filed May 12, 1975, now U.S. Pat. No. 3,956,400 issued May 11, 1976.

This invention relates to the polymerization of conjugated alkadienes and vinyl-substituted aromatic monomers. In another aspect, the invention relates to a method to make diisoprenyl ether.

THE INVENTION

An object of this invention is to provide a process for polymerizing conjugated alkadienes and vinyl-substituted aromatic monomers in the presence of a novel crosslinking agent.

Another object of this invention is to provide a method to produce this crosslinking agent.

These and other objects, embodiments, advantages, details and features of this invention will be apparent from the following detailed description of the invention, the examples and the appended claims.

In accordance with this invention, I have discovered that di(2-methylene-but-3-en-1-yl)ether is an effective additive to an alkadiene/monovinyl arene polymerization mixture for increasing the Mooney viscosity of the polymer produced.

This ether has the formula

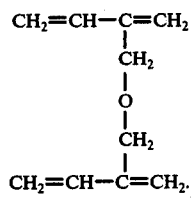

In the following, the compound of this invention is called diisoprenyl ether. The "isoprenyl" radical, as used herein, is the 2-methylene-but-3-en-1-yl radical having the formula

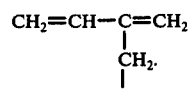

In accordance with this invention, there is also provided a process for producing the diisoprenyl ether. The process comprises the steps of hydrolyzing 2-halomethyl-1,3-butadiene in the presence of strong inorganic base, such as an alkali metal or alkaline earth metal hydroxide. "Halo" is defined to be one member of the group consisting of chloro, bromo and iodo. The strong alkali metal or alkaline earth metal hydroxide is selected from the group consisting of sodium hydroxide, potassium hydroxide, lithium hydroxide, calcium hydroxide, magnesium hydroxide, and barium hydroxide. It is presently preferred to react 2-chloromethyl-1,3-butadiene with an aqueous solution of sodium hydroxide such as to produce the diisoprenyl ether. The molar ratio of 2-chloromethyl-1,3-butadiene to sodium hydroxide will preferably be in the range of about 1:3 to 1:4.

It is presently preferred to carry out the process described above in the presence of a polymerization inhibitor or stabilizer. The function of this agent is to inhibit polymerization of the diisoprenyl ether formed during the hydrolysis reaction. Any well-known agent that inhibits the polymerization of alkadienes can be used. Examples of such inhibitors or stabilizers are phenothiazine, p-phenylene diamine, N-n-octyl-p-phenylene diamine, hydroquinone, 4-tert-butyl-p-cresol, 2,6-di-tert-butyl catechol and the like.

In order to improve the yield of this process in accordance with this invention, it is also preferred to carry out the hydrolysis of the 2-halomethyl-1,3-butadiene in the presence of a phase transfer agent. The function of this phase transfer agent is to facilitate the chemical reaction between components of the organic liquid phase and components of the aqueous liquid phase. Various transfer agents known in the art can be used for this purpose as long as these agents are compatible with the reagents used and do not react in an adverse manner with the unsaturated portions of the isoprenyl radicals. Examples of such phase transfer agents are quaternary ammonium salts, such as tricaprylylmethylammonium halogenides, particularly tricaprylylmethylammonium chloride, dodecyltriethylammonium bromide, tetrabutylammonium bromide, and the like. Other transfer agents are the phosphonium salts, such as tetrabutylphosphonium chloride. The anions of the quaternary ammonium and phosphonium salts can be selected from the group consisting of chloride, bromide, iodide derived from the hydrohalic acids; acetate, benzoate, butyrate and the like derived from carboxylic acids, sulfate, hydrogen sulfate and phosphates; benzenesulfonate, p-toluenesulfonate, methanesulfonate and the like derived from sulfonic acids. Preferably, both a phase transfer agent and a polymerization inhibitor are used in the reaction mixture.

The reaction conditions are adjusted such as to keep the reagents essentially in the liquid phase. Any combination of reaction time and temperature can be used which is sufficient to bring about substantial hydrolysis without significant loss of product due to side reactions such as polymerization. Generally, reactions at 20°–80° C for 0.5–40 hr. can be used. Temperatures around 50° C and atmospheric pressure are presently preferred conditions for the process of hydrolyzing the 2-halomethyl-1,3-butadiene with the strong alkali metal or alkaline earth metal hydroxide to give the diisoprenyl ether.

A further embodiment of this invention relates to a polymerization process. In accordance with the process of this invention, monomers selected from the group consisting of conjugated alkadienes and vinyl-substituted aromatic monomers and mixtures of such monomers are polymerized under emulsion polymerization conditions in accordance with technologies well known in the art. However, in accordance with this invention, the polymerization emulsion contains diisoprenyl ether as a crosslinking agent. It has been found that the polymers from conjugated alkadienes produced in accordance with this process exhibit an improved Mooney viscosity compared to polymers produced by the same process containing no diisoprenyl ether in the polymerization mixture. The diisoprenyl ether in accordance with this invention is incorporated as an ingredient in the emulsion of an emulsion polymerization process. The conditions, as well as the ingredients, initiators, etc. of this emulsion polymerization process are well known in the art and as such do not constitute a part of this invention. The emulsion polymerization process is, for instance, described in U.S.

Pat. No. 2,720,510 issued to A. Rothlisberger and C. Uraneck on Oct. 11, 1955.

The preferred conjugated alkadienes that can be emulsion polymerized in accordance with this invention in the presence of the diisoprenyl ether have 4 to about 8 carbon atoms per molecule. Examples of such alkadienes are 1,3-butadiene, isoprene, piperylene, methylpentadiene, 2,3-dimethyl-1,3-butadiene and halogen-substituted alkadienes, such as chloroprene and methylchloroprene.

The preferred vinyl-substituted aromatic monomers that can be polymerized in accordance with this invention in the presence of the diisoprenyl ether contain 8 to about 12 carbon atoms per molecule. Examples are styrene and alpha-methylstyrene, as well as other alkyl-substituted and halogen-substituted styrenes.

The quantity of the crosslinking compound, namely the diisoprenyl ether in accordance with this invention, used in the polymerization mixture depends upon the properties of the polymer desired and thus can be varied in broad ranges. The diisoprenyl ether will, however, usually be employed in a quantity in the range of about 0.01 to about 10 phm (parts by weight per 100 parts by weight of total monomers), the range of about 0.05 to about 2.0 phm being presently preferred.

In the presently preferred emulsion polymerization process of this invention, the aqueous emulsion comprises the monomers, and emulsifier, a modifier, an initiator system, and the diisoprenyl ether. In addition to these compounds which have to be present for the emulsion polymerization process, other components such as activating agents, stabilizers and the like can also be incorporated into the reaction mixture. Antioxidants can be added to the final polymer.

Modifying agents for this emulsion polymerization are well known in the art. The function of these modifying agents is to control the molecular weight of the polymer being prepared. Examples for such modifying agents are mercaptans with 6 to 16, preferably 9 to 14, carbon atoms. The most preferred mercaptan modifiers are those of tertiary alkyl configuration, tertiary dodecyl mercaptan being an example. Organic disulfides, such as diisopropyl xanthogen disulfide, can also be used as modifiers. Among the modifying agents, the mercaptans having about 9 to about 14 carbon atoms, more particularly the tertiary-dodecyl mercaptans, are presently preferred.

Any known emulsifier can be incorporated in the emulsion polymerization process. Examples for such emulsifiers are the metal salts of the fatty acids, e.g. sodium stearate. Usually, the soap is formed in situ, which means that the fatty acid is introduced into the polymerization mixture and the strong base, such as sodium hydroxide, is added. Thereby the soap is formed. The emulsifier is used in quantities generally ranging from about 1 to about 10 parts by weight per 100 parts by weight of monomer.

It is further preferred to include in the emulsion polymerization batch about 0.1 to about 10 millimols of an oxidant per 100 parts by weight of the total monomers. Examples for such oxidants are the organic peroxides having 6 to about 16 carbon atoms per molecule, e.g., p-menthane hydroperoxide. The function of this oxidant is that of an oxidizing component in the initiator system which generates free radicals such as free hydroxyl radicals to initiate the emulsion polymerization.

The emulsion polymerization itself is carried out generally at temperatures of about −20° C to about 70° C.

The pressure in the reaction vessel will usually be 0 to about 100 psig. The emulsion polymerization is usually carried out for about 1 to about 20 hours.

The invention will be more fully understood from the following examples, which constitute preferred embodiments of this invention, but are not intended to limit the scope thereof.

EXAMPLE I

Preparation of Diisoprenyl Ether

A mixture of 40 ml water and 9.6 g (0.24 mol) sodium hydroxide was placed in a three-necked 100 ml round bottom flask equipped with a stirrer, a thermometer, and a water-cooled reflux condenser. The aqueous sodium hydroxide solution was brought to a temperature of 50° C and a charge of 10 g (0.084 mol) 2-chloromethyl-1,3-butadiene, 4.0 g (0.008 mol) tricaprylylmethylammonium chloride, commercially available under the trademark Aliquat 336 from General Mills Corporation, and 0.1 g phenothiazine stabilizer was added to the reaction flask. The reaction mixture was heated under a nitrogen atmosphere with stirring for a period of 23 hours.

The two-phase reaction mixture was cooled to room temperature, saturated with sodium chloride and extracted four times with 25 ml portions of ether. The ether extracts were separated, combined and washed with 5 ml of a 5 percent aqueous sodium bicarbonate solution. The organic phase was separated, dried over anhydrous sodium sulfate and distilled to give 2.51 g water-white distillate (boiling point 85° C to 50° C as the pressure decreased from 10 to 3 mm) and 4.29 g tarry residue.

The infrared spectrum of the distillate was consistent with the diisoprenyl ether structure. The diisoprenyl ether sample was redistilled through a 6-inch Vigreux column to give 1.90 g of a product having a boiling point of 66° to 67° C at a pressure of about 9 mm. The yield based on 75 percent conversion of 2-chloromethyl-1,3-butadiene was 48 percent. Gas chromatographic analysis of the diisoprenyl ether product showed the sample to be 99.1 weight percent pure; the remainder of the sample was 0.9 weight percent of 2-hydroxymethyl-1,3-butadiene. The diisoprenyl ether was stabilized with 0.1 weight percent of phenothiazine.

The diisoprenyl ether exhibited a refractive index of 1.4902 at 20° C with the D line of sodium and possessed a pleasant fruity-pungent odor. The elemental analysis of the diisoprenyl ether sample was:

Calculated for $C_{10}H_{14}O$: C 79.96 percent; H 9.39 percent;

Found: C 79.20 percent; H 9.50 percent.

The diisoprenyl ether structure was further verified by mass and nuclear magnetic resonance spectral data.

EXAMPLE II

Butadiene-styrene Emulsion Polymerization with Diisoprenyl Ether as Crosslinking Agent Into an emulsion polymerization reactor the following components were introduced in the quantities shown in the following table; phm means parts by weight per 100 parts by weight of monomer.

| | Components | phm |
|---|---|---|
| (a) | Polymerization grade hydrogenated potassium fatty acid salt | 4.6 |
| (b) | Water (total volume in reaction | |

| | Components | phm |
|---|---|---|
| | mixture) | 180.0 |
| (c) | Potassium hydroxide | 0.02 |
| (d) | Potassium chloride | 0.30 |
| (e) | Sodium salts of polymerized alkyl naphthalene sulfonic acids | 0.207 |
| (f) | Tetrasodium salt of ethylene diamine tetraacetic acid tetrahydrate | 0.016 (0.35 mmol) |
| (g) | Styrene | 30.0 |
| (h) | t-Dodecyl mercaptan | 0.3202 |
| (i) | Crosslinking agent (diisoprenyl ether) | 0.10 |
| (j) | Butadiene | 70.0 |
| (k) | p-Menthane hydroperoxide | 0.0625 (0.363 mol) |
| (l) | Ferrous sulfate heptahydrate | 0.010 (0.036 mmol) |
| (m) | Sodium formaldehyde sulfoxylate dihydrate | 0.050 (0.325 mmol) |
| (n) | Tetrasodium salt of ethylenediamine tetraacetic acid tetrahydrate | 0.032 (0.070 mmol) |
| (o) | Sodium dimethyldithiocarbamate | 0.16 |
| (p) | N-1,3-dimethylbutyl-N'-p-phenylenediamine | 1.0 |

The charge sequence and procedure was as follows: The aqueous soap solution consisting of components (a) to (f) of the above shown recipe was first introduced into the reactor. Then, the styrene and the mercaptan were added, thereafter the crosslinking agent in accordance with this invention, the diisoprenyl ether, was introduced into the reactor. Then, the butadiene was added. After the addition of the p-menthane hydroperoxide, the reaction mixture was agitated for about 30 minutes to lower the temperature of the ingredients to about 5° C. After the addition of the components (l) through (n), the polymerization was carried out at about 5° C until a conversion of about 60 percent of the monomers was obtained. This was achieved after about 6 hours. Then, the carbamate (o) was added to stop the reaction and the antioxidant finally was added to the polymerization product mixture. The latex was creamed by the addition of aqueous sodium chloride solution and the copolymer was coagulated by the addition of dilute sulfuric acid. The coagulated copolymer was isolated by filtration, washed and dried.

After the above described isolation of the copolymer samples, the Mooney viscosity was determined for copolymer samples prepared as described above. The Mooney viscosity, determined in accordance with ASTM D-1646-72 was found to be 57 ½ for a copolymer sample prepared in accordance with the present invention as described in example II.

EXAMPLE III

Butadiene-Styrene Copolymerization Without Diisoprenyl Ether

The Example II was repeated with the exception, however, that no diisoprenyl ether was added to the polymerization mixture. The polymer thus obtained was isolated as described above and the Mooney viscosity was measured. It was found that the Mooney viscosity of this control polymer was 19 ¼. The Mooney viscosity of a polymer reflects its molecular weight as well as its rigidity.

A comparison of the two Examples II and III clearly shows that the diisoprenyl ether of this invention greatly increases the Mooney viscosity which indicates that the diisoprenyl ether acts as a crosslinking agent in this emulsion polymerization process. The comparative data are also shown in tabular form in the following table:

| Example | | Mooney Viscosity |
|---|---|---|
| III | Control (No Crosslinking Agent) | 19¼ |
| II | Invention (Diisoprenyl Ether as Crosslinking Agent) | 57½ |

It has been found that 1,4-pentadien-3-yl 2,4-pentadien-1-yl ether as well as di(2,4-pentadien-1-yl)ether were not effective as crosslinking agents. These isomers to the diisoprenyl ether of this invention were found to leave the Mooney viscosity of the polymers compared with the control unchanged or even slightly reduced the Mooney viscosity. Therefore, the isoprenyl structure of the pentadienyl radical given above is believed to be critical for the effectiveness of the diisoprenyl ether of this invention.

Reasonable variations and modifications which will be apparent to those skilled in the art can be made in this invention without departing from the spirit and scope thereof.

I claim:

1. In a process for the production of a copolymer from a mixture of monomers wherein at least one monomer is a conjugated alkadiene having 4 to 8 carbon atoms and at least one other monomer of said mixture is a vinyl-substituted aromatic monomer having 6 to 10 carbon atoms or for the production of a polymer of at least one conjugated alkadiene having 4 to 8 carbon atoms by emulsion polymerization wherein said polymerization is carried out under polymerization conditions in the presence of a polymerization initiator, the improvement which comprises carrying out the emulsion polymerization step in the presence of diisoprenyl ether, said ether having the formula

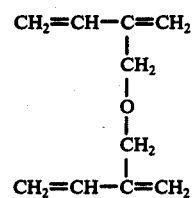

and being incorporated in an amount sufficient to effect crosslinking of the polymer in said polymerization emulsion.

2. A process in accordance with claim 1 wherein said diisoprenyl ether is used in a quantity of about 0.01 to about 10 parts by weight of the diisoprenyl ether per 100 parts by weight of total monomeric material.

3. A process in accordance with claim 1 wherein at least one alkadiene monomer and at least one vinyl-substituted aromatic monomer are copolymerized in the presence of said diisoprenyl ether.

4. A process in accordance with claim 1 wherein styrene and butadiene are copolymerized in the presence of diisoprenyl ether.

5. A process in accordance with claim 1 wherein said diisoprenyl ether is used in a quantity of about 0.05 to about 2.0 parts by weight per 100 parts by weight of total monomeric material.

6. The product of the process of claim 4.

* * * * *